June 17, 1930.　　　　　E. E. WEMP　　　　　1,765,304
CLUTCH FRICTION DEVICE
Filed Aug. 17, 1928　　　2 Sheets-Sheet 2
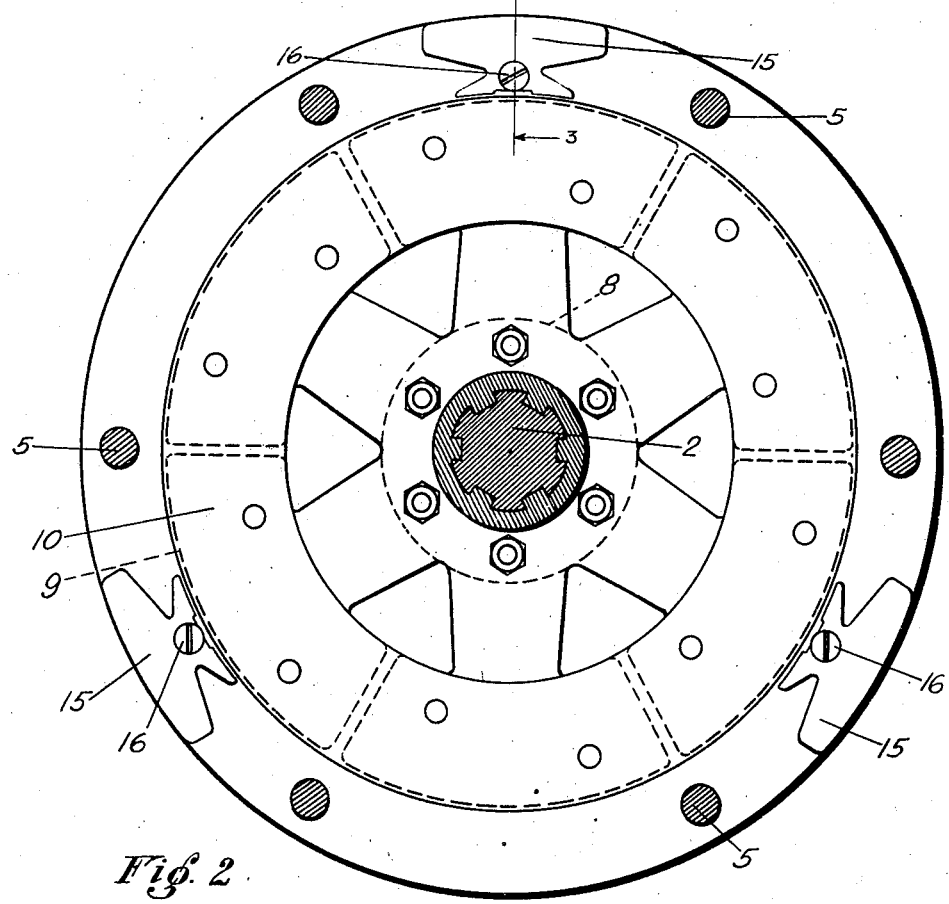
Fig. 2.
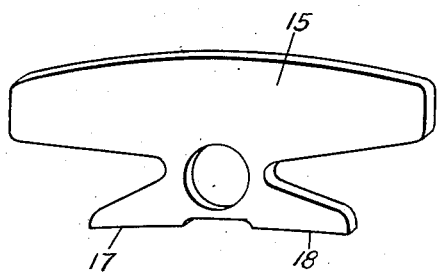
Fig. 4.
INVENTOR.
Ernest E. Wemp.
BY
ATTORNEY.

Patented June 17, 1930

1,765,304

UNITED STATES PATENT OFFICE

ERNEST E. WEMP, OF DETROIT, MICHIGAN

CLUTCH FRICTION DEVICE

Application filed August 17, 1928. Serial No. 300,174.

This invention relates to a friction device which is especially useful in a clutch of an automotive vehicle for the purpose of facilitating shifting of gears.

In present day automobiles the trend is toward larger and more powerful engines. Accordingly, some of the clutch parts have to be made larger and heavier to transmit the power from a larger engine, and also some of the other power transmitting parts may be made heavier and stronger including some of the gears in the transmission.

It will be appreciated by those skilled in the art that a driven member of the clutch is connected directly to certain of the gears in the transmission and that shifting of the gears in the transmission is effected by first releasing the clutch so that the driven member and the gears directly associated therewith are free from the driving parts of the clutch. When the driven parts of the clutch or the other driven parts associated therewith are increased in weight and strength, their momentum correspondingly increases so that when the clutch is released the driven member of the clutch and the gears in transmission continue to rotate, with the result that it is difficult to shift the gears.

For example, when an automobile is started in low gear, the clutch and the gears associated therewith in the transmission are rotated at a relatively high speed. When the clutch is released to shift gears, however, the continued rotation of the driven part of the clutch and the gears, by reason of momentum, makes for difficult shifting and ofttimes clashing of the gear teeth.

Accordingly, the present invention contemplates means associated with the driving and driven members of a clutch arranged to be effective for decelerating and accelerating the driven member of the clutch as the case requires. More specifically, drag or friction members may be connected directly to the driving or driven member and arranged to frictionally engaged with a friction action the other of said members. This construction involves members so arranged as not to interfere with the operation of the clutch and which are preferably ineffective when the clutch is operating and accordingly they are not affected by centrifugal action. They are arranged, however, to effect their friction action on one of the clutch members upon change of angular velocity either upon acceleration or deceleration. This will be brought out in more detail as the description progresses.

In the accompanying drawings:

Fig. 2 is a sectional view taken on line 2—2 of Fig. 1.

Fig. 3 is an enlarged detail taken on line 3—3 of Fig. 2.

Fig. 4 is a perspective view of one of the drag or friction members.

Figure 1:
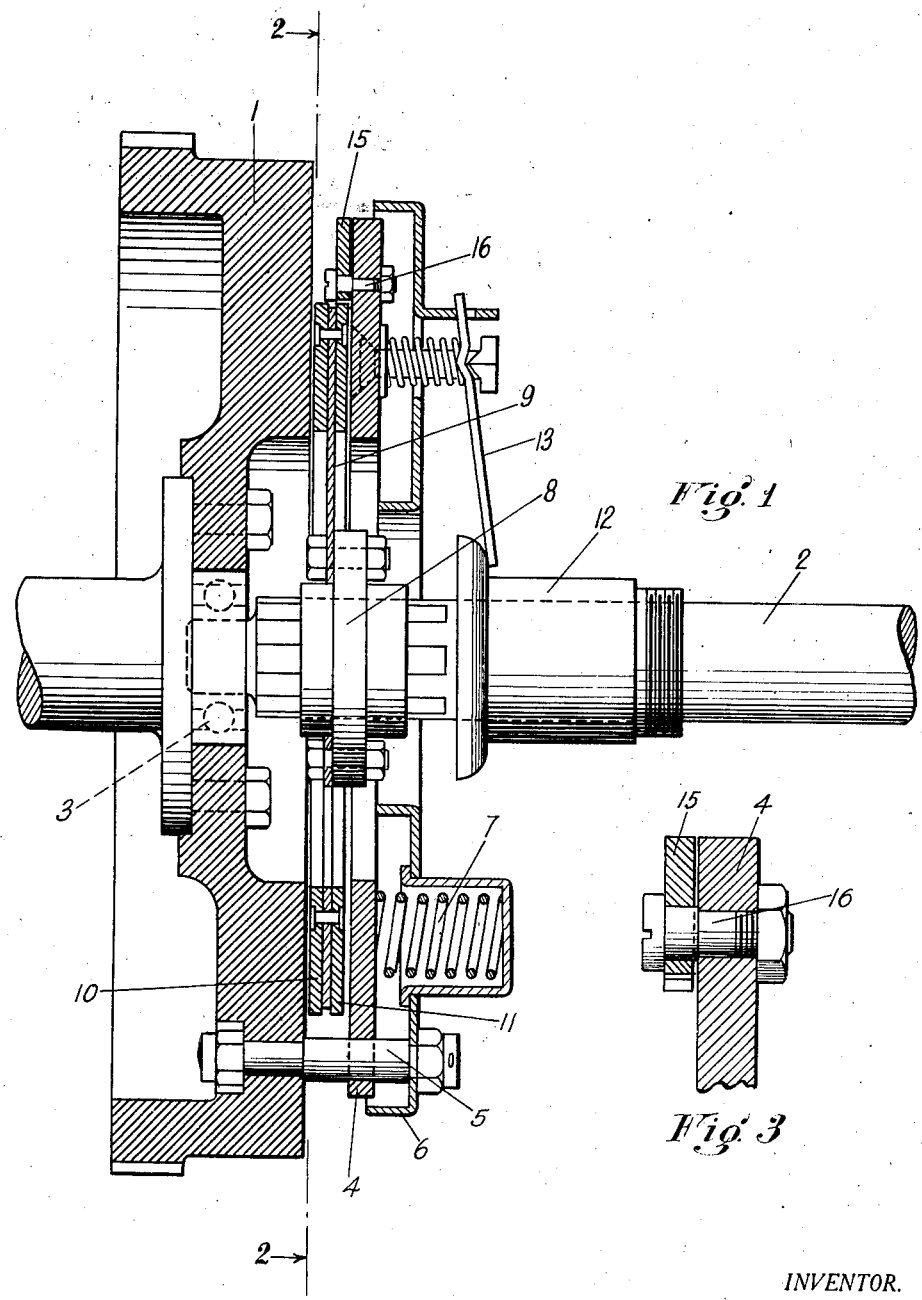
Fig. 1 is a sectional view taken through a clutch which embodies the present invention.

In these drawings, an engine fly-wheel is shown at 1, and a driven shaft at 2 which may be journalled at one end as at 3. The clutch construction includes a driving plate 4 connected to the fly-wheel by bolts 5, and a cover plate 6 which supports packing springs 7. The driven parts of the clutch include a hub 8 which may be splined to the shaft 2 and which carries a disc 9 having clutch facings 10 and 11.

The driven disc 9 is disposed between the fly-wheel and the driving disc 4, and the springs 7 act to pack the fly-wheel and driving disc 4 against the facings 10 and 11 of the driven disc. The clutch is released by means of a sleeve 12 which may be actuated by a suitable pedal (not shown) and which functions through one or more levers 13 to retract the disc 4 against the action of springs 7. Thus far the clutch construction is conventional, and the particular form shown is merely for the purpose of exemplification, as various types of clutch constructions can be used in conjunction with the invention.

Pivotally secured to either the driving member or driven member of the clutch is one or more drag or friction members, and as shown, three of such members are used. As shown in Figs. 1 and 2 these members 15 are pivotally mounted upon the driving disc 4 by means of bolts 16. As will be clearly seen by reference to Fig. 4, each member has a friction shoe portion 17 and a friction shoe portion 18 and the mass of metal of these members is disposed radially outward from the point of pivotal mounting. These members, however, are symmetrical about a radial center line, or in other words, they are balanced so that they are unaffected by centrifugal action.

These friction members overlie the driven member, as illustrated in Fig. 1, and the shoe portions are adapted to frictionally engage the peripheral edge of the driven disc at appropriate times as will later be brought out. For this purpose the frictional material 10 and 11, or both, may extend slightly beyond the outside edge of the disc 9 for the purpose of providing frictional engagement with the members 15. Due to the fact that the mass of metal of these members is so arranged that the center of gravity is disposed radially outward from the pivotal connections, the members are caused to rock upon their pivotal mountings upon change of angular velocity of the driving disc. This movement causes one of the shoes 17 and 18 to frictionally engage the clutch lining and the driven member with the drag action.

Assume that an automobile is in low gear and the clutch parts and certain of the gears in the transmission are rotating at a relatively high speed, and that it is now desirable to shift the gears in the transmission. The clutch is now released, and in the normal operation of an automotive vehicle, the throttle is simultaneously relieved so that the engine fly-wheel and driving disc of the clutch decelerate. The driven disc, however, and the gears directly associated therewith, tend to continue rotating, due to their momentum. Where the parts are heavy this is more pronounced. However, upon deceleration of the engine the members 15 are caused to rock upon their pivotal mountings so that one of the shoe portions of each frictionally engages with the clutch facing, thus effecting a drag action upon the driven member, and causing the driven member to be slowed up. Thus, the gears and transmission are similarly slowed up and gear shifting may be easily accomplished.

Ofttimes a situation occurs where the vehicle is moving along the roadway relatively fast, as for example, when coasting down a hill, and it is extremely difficult to engage the gears in transmission, due to the fact that some of the gears which rotate with the rear wheels are moving quite fast, while the driven member of the clutch and the gears associated therewith are moving slowly or are entirely stationary. At this time it is but necessary to accelerate the engine, thus again causing a rocking of the members 15 so that they frictionally engage the driven disc and impart rotative movement thereto. Accordingly, it will be observed that these members are effective upon acceleration or deceleration of the part to which they are attached, but that they are unaffected by centrifugal action.

The invention has been described as being particularly applicable to constructions which embody relatively heavy parts, which by reason of their weight, have considerable inertia which keeps them rotating when released from the engine. However, the invention is not limited to a clutch of any particular weight or size, inasmuch as it is obvious that the invention is applicable to any clutch regardless of size or weight. It is thought to be preferred, and it is advantageous, to mount the friction members upon a driving part.

Claims:

1. In a clutch, the combination of a driving member, a driven member, said driving member having a diameter greater than the driven member, a friction device pivotally mounted on the driving member and positioned beyond the periphery of the driven member, said device being formed so that its center of gravity is radially removed from its pivot point whereby change of angular velocity of the driving member effects rocking of the device upon its pivot, said device having a part adapted to frictionally engage the periphery of the driven member.

2. In a clutch, the combination of a driving member, a driven member, said driving member having a diameter greater than the driven member, a friction device pivotally mounted on the driving member and positioned beyond the periphery of the driven member, said device being formed so that its center of gravity is radially removed from its pivot point whereby change of angular velocity of the driving member effects rocking of the device upon its pivot, said device having a part adapted to frictionally engage the periphery of the driven member, said driven member being in the form of a disc provided with clutch facing material and the said material extending beyond the peripheral edge of the disc to afford frictional engagement for the friction device.

3. In a clutch, the combination of a driving member, a driven member, clutch facing material on the driven member adapted for engagement with the driving member, a friction brake device pivotally mounted upon the driving member and positioned radially removed from the clutch facing material, said friction device being formed so that its center of gravity is radially removed from its pivot point whereby change of angular velocity of the driving member effects rocking of the device upon its pivot, and friction shoe portions on said friction device adapted to frictionally engage the edge of the said clutch facing material upon rocking movement of the said friction device.

In testimony whereof I affix my signature.

ERNEST E. WEMP.